United States Patent
Thieret et al.

(10) Patent No.: US 6,714,319 B1
(45) Date of Patent: Mar. 30, 2004

(54) ON-LINE PIECEWISE HOMEOMORPHISM MODEL PREDICTION, CONTROL AND CALIBRATION SYSTEM FOR A DYNAMICALLY VARYING COLOR MARKING DEVICE

(75) Inventors: Tracy E. Thieret, Webster, NY (US); Eric S. Hamby, Fairport, NY (US); Eric M. Gross, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/454,431

(22) Filed: Dec. 3, 1999

(51) Int. Cl.$^7$ .............................. G06K 15/00; H04N 1/46
(52) U.S. Cl. ..................... 358/1.9; 358/2.1; 358/3.04; 358/522
(58) Field of Search ................ 358/1.9, 2.1, 3.04, 358/517, 518, 522, 530; 322/167

(56) References Cited

U.S. PATENT DOCUMENTS

| | | | |
|---|---|---|---|
| 2,790,844 A | 4/1957 | Neugebauer | 178/5.2 |
| 3,870,968 A | 3/1975 | Vosteen et al. | 330/207 P |
| 4,205,257 A | 5/1980 | Oguro et al. | 315/39.69 |
| 4,275,413 A | 6/1981 | Sakamoto et al. | 358/80 |
| 4,403,866 A | 9/1983 | Falcoff et al. | 366/132 |
| 4,500,919 A | 2/1985 | Schreiber | 358/78 |
| 4,724,461 A | 2/1988 | Rushing | 355/14 DR |
| 4,731,860 A | 3/1988 | Wahl | 382/281 |
| 4,853,639 A | 8/1989 | Vosteen et al. | 324/457 |
| 4,887,217 A | 12/1989 | Sherman et al. | 364/468 |
| 5,003,327 A | 3/1991 | Theodoulou et al. | 346/154 |
| 5,045,882 A | 9/1991 | Roehrs et al. | 355/208 |
| 5,103,429 A | 4/1992 | Gelchinsky | 367/38 |
| 5,107,332 A | 4/1992 | Chan | 358/80 |
| 5,185,661 A | 2/1993 | Ng | 358/505 |
| 5,243,383 A | 9/1993 | Parisi | 355/208 |
| 5,416,613 A | 5/1995 | Rolleston et al. | 358/518 |

(List continued on next page.)

FOREIGN PATENT DOCUMENTS

| | | | |
|---|---|---|---|
| EP | 0 398 502 B1 | 6/1996 | H04N/1/46 |
| EP | 0 741 491 A2 | 11/1996 | H04N/1/60 |
| EP | 0 747 853 A2 | 12/1996 | G06K/15/02 |
| EP | 0814400 A2 | 12/1997 | G06F/3/12 |
| EP | 0 814 400 A2 | 12/1997 | G06F/3/12 |
| EP | 0 854 638 A2 | 7/1998 | H04N/1/62 |
| JP | 4-314768 | 11/1992 | C09D/7/14 |
| WO | WO 95/33331 | 12/1995 | H04N/1/60 |

OTHER PUBLICATIONS

Olga Yaritza Ramirez, "Online System Identification Using an Adaptive Algorithm to Control Color Drift in a Marking Device", (Graduate Paper submitted in partial fulfillment of degree requirements, Sep. 1999, Rochester Institute of Technology, Rochester, NY.

(List continued on next page.)

Primary Examiner—Jerome Grant, III
(74) Attorney, Agent, or Firm—Fay, Sharpe, Fagan, Minnich & McKee, LLP

(57) ABSTRACT

A color marking system includes a control system for maintaining an accurate representation for approximating color space transformation comprising a set of piecewise homeomorphisms. The homeomorphisms and parametric models are selectively adjustable in accordance with printer/display calibrating data. Preferably the homeomorphisms comprise corresponding tetrahedra with domain and co-domain color spaces. If error above a selected level is detected, the tetrahedra are adjusted by calculating new locations for their vertices having a consequence of recomputation of model parameters and converging parametric model performance in accordance with a predetermined objective of the system. An inverse of the model is used for feedforward control of the marking system.

13 Claims, 3 Drawing Sheets

OTHER PUBLICATIONS

Po–Chieng Hung, "Tetrahedral Division Technique Applied to Colorimetric Calibration for Imaging Media", Annual meeting IS&T, NJ May, 1992, p. 419–422.

Po–Chieng Hung, "Colorimetric Calibration for Scanners and Media", SPIE, vol. 1448, Camera and Input Scanner System, (1991).

Sigfredi I. Nin et al., "Printing CIELAB Images on a CMYK Printer Using Tri–Linear Interpolation", SPIE Proceedings, vol. 1670, 1992, p. 316–324.

Henry Kang, "Color Technology for Imaging Devices", pp. 318–327.

Ocean Optics, Inc., "Miniature Lights for Miniature Spectrometers".

Chang, James Z. et al., "Sequential Linear Interpolation of Multidimensional Functions", IEEE Transactions on Image Processing, vol. 6, No. 9, Sep. 1997.

Groff, Richard, Khargonekar, P., Koditschek, D, Thieret, T., Mestha, LK, "Modeling and Control of Color Xerographic Processes", Paper to be presented at the CDC99 meeting in Phoenix, Arizona, Dec. 7–10, 1999.

* cited by examiner

U.S. PATENT DOCUMENTS

| Patent No. | | Date | Inventor | Class |
|---|---|---|---|---|
| 5,471,313 | A | 11/1995 | Thieret et al. | 358/296 |
| 5,471,324 | A | 11/1995 | Rolleston | 358/518 |
| 5,481,380 | A | 1/1996 | Bestmann | 358/504 |
| 5,483,360 | A | 1/1996 | Rolleston et al. | 358/518 |
| 5,491,568 | A | 2/1996 | Wan | 358/518 |
| 5,508,826 | A | 4/1996 | Lloyd et al. | 358/501 |
| 5,528,386 | A | 6/1996 | Rolleston et al. | 358/522 |
| 5,539,522 | A | 7/1996 | Yoshida | 358/296 |
| 5,544,258 | A | 8/1996 | Levien | 382/169 |
| 5,559,173 | A | 9/1996 | Campo et al. | 523/303 |
| 5,581,376 | A | 12/1996 | Harrington | 358/518 |
| 5,594,557 | A | 1/1997 | Rolleston et al. | 358/518 |
| 5,612,902 | A | 3/1997 | Stokes | 364/526 |
| 5,659,406 | A | 8/1997 | Imao et al. | 358/518 |
| 5,662,044 | A | 9/1997 | Loffler et al. | 101/492 |
| 5,664,072 | A | 9/1997 | Ueda et al. | 395/109 |
| 5,671,059 | A | 9/1997 | Vincent | 356/402 |
| 5,708,916 | A | 1/1998 | Mestha | 399/49 |
| 5,717,978 | A | 2/1998 | Mestha | 399/46 |
| 5,734,407 | A | 3/1998 | Yamada et al. | 347/133 |
| 5,734,745 | A | 3/1998 | Ohneda | 382/167 |
| 5,734,802 | A | 3/1998 | Maltz et al. | 395/109 |
| 5,739,927 | A | 4/1998 | Balasubramanian et al. | 358/518 |
| 5,748,221 | A | 5/1998 | Castelli et al. | 347/232 |
| 5,749,019 | A | 5/1998 | Mestha | 399/46 |
| 5,749,021 | A | 5/1998 | Mestha et al. | 399/49 |
| 5,754,918 | A | 5/1998 | Mestha et al. | 399/48 |
| 5,760,913 | A | 6/1998 | Falk | 358/298 |
| 5,798,764 | A | 8/1998 | Akiyama | 345/423 |
| 5,809,213 | A | 9/1998 | Bhattacharjya | 395/106 |
| 5,812,903 | A | 9/1998 | Yamada et al. | 399/42 |
| 5,822,079 | A | 10/1998 | Okuno et al. | 358/300 |
| 5,828,781 | A | 10/1998 | Nakano | 382/167 |
| 5,852,443 | A | 12/1998 | Kenworthy | 345/441 |
| 5,884,118 | A | 3/1999 | Mestha et al. | 399/15 |
| 5,923,770 | A | 7/1999 | O'Donnell et al. | 382/131 |
| 5,963,244 | A | 10/1999 | Mestha et al. | 347/251 |
| 5,969,725 | A | 10/1999 | Fujiki et al. | 345/619 |
| 6,133,921 | A | 10/2000 | Turkiyyah et al. | 345/420 |
| 6,204,939 | B1 | 3/2001 | Lin et al. | 358/518 |
| 6,208,353 | B1 * | 3/2001 | Ayer et al. | 345/435 |
| 6,269,184 | B1 | 7/2001 | Spaulding et al. | 382/167 |
| 6,342,951 | B1 | 1/2002 | Eschbach et al. | 358/1.9 |
| 6,373,489 | B1 | 4/2002 | Lu et al. | 345/428 |
| 6,400,843 | B1 | 6/2002 | Shu et al. | 382/167 |
| 6,404,511 | B1 | 6/2002 | Lin et al. | 358/1.9 |
| 6,421,142 | B1 | 7/2002 | Lin et al. | 358/1.9 |

ON-LINE PIECEWISE HOMEOMORPHISM MODEL PREDICTION, CONTROL AND CALIBRATION SYSTEM FOR A DYNAMICALLY VARYING COLOR MARKING DEVICE

FIELD OF THE INVENTION

The subject invention pertains to the art of color management and image/text printing or display systems, and is especially applicable to a method and apparatus wherein a color print output is monitored for adaptive on-line construction of an analytical model useful for feedforward control of printer operation. More particularly, the invention relates to system controls for modeling the printer with a piecewise homeomorphism (PH) by implementing an adaptive algorithm for estimation of model parameters corresponding to selected PH configurations and based upon processing of a relatively small number of control samples, target colors or other input signals, whereby the model is then useful for regular on-line calibrating of the printer.

Color correction and/or control should not be confused with color registration systems and sensors for insuring that colors are positioned properly, printed accurately, superposed correctly and/or adjacent to one another.

BACKGROUND OF THE INVENTION

Color perception is a psychological and physiological phenomenon that involves three elements: light, object and observer. Color changes as light, medium (i.e., paper, monitor) and observer interact. Color may be perceived differently under different types of lighting. Light sources that affect color include incandescent and fluorescent light. The first makes color seem more red and orange while the second emphasizes green and yellow tones. Different types of media also affect color perception. Observers view images on paper using reflection. In other cases the medium can be transmissive or emissive. Transparencies are an example of a transmissive medium while a computer monitor is emissive. The third element in the phenomenon is the observer. Different people may see the same color slightly differently. In order to characterize color image quality, the interaction of these elements must be understood so that when colors are intended to be matched, i.e., monitor to printer, scanner to printer, etc., acceptable appearance results.

For automatic control systems spectral data is often used to represent color perception as a pattern of wavelengths that leave the object before being interpreted by a viewer. Spectral data defines color independent of observer influence. Spectrophotometers or calorimeters are sensing devices used to measure spectral data.

There are different ways of representing color. One way color is described consists of the following parameters: hue, lightness and saturation. Hue represents the actual color wavelength (red, blue, etc.), lightness corresponds to the white content while saturation captures the richness or amplitude in color. Another way of describing color uses the three dominant primary colors, red, blue and green (RGB). By combining these primary colors, in different intensities, most colors visible to humans can be reproduced. Monitors and scanners use the additive RGB color process. Printers use the subtractive CMYK (cyan, magenta, yellow and black) color process based on light reflected from inks coated on a substrate. To the extent that the color representations described above fail to reproduce color predictably, it is because they are observer or device dependent.

In today's business and scientific world, color has become essential as a component of communication. Color facilitates the sharing of knowledge and ideas. Companies involved in the development of digital color print engines are continuously looking for ways to improve the accuracy and total image quality of their products. One of the elements that affects image quality is the ability to consistently produce the same quality image output on a printer from one day to another, from one week to the next, month after month. Colors on a printer tend to drift over time. The variations arise from changes in the properties of the marking process (toner tribo, photoreceptor charge, transfer variations, temperature, humidity, and other marking and environmental factors). Maintaining an accurate printer operation requires regular recalibration, usually a time consuming, and accordingly undesirable task of sampling large numbers of test patches which are additionally interpolated to construct the color rendition dictionary (CRD) describing the printer transforming process. As electronic marketing has placed more importance on the accurate representation of merchandise in illustrative print or display media, consistent and accurate printer operation becomes more important, and regular recalibrating becomes more necessary.

Customers will usually specify their color demands in a device independent color space as part of a page description language (PDL). $L^*$, $a^*$, $b^*$ are the independent space representations of the CIE (Commission Internationale de L'éclairage) for color standards utilized in the functional modeling of these color demands. $L^*$ defines lightness, $a^*$ corresponds to the red/green value and $b^*$ denotes the amount of yellow/blue. Accurate transformation between $L^*$, $a^*$, $b^*$ representations and CMYK representations and vise versa are the principal applications of the subject invention.

When customers specify colors in device independent color coordinates, it is incumbent upon the printing/display device to determine which combination of available colorants (typically cyan, magenta, yellow and black) will yield the colors specified by the customer. This determination is frequently embodied in a look-up table (LUT) called the color rendition dictionary (CRD). Calculation of the CRD involves making patches in the printer's input space and examining the output thus yielding the forward transfer function which is then inverted to give the recipes for making the colors available in the printer's gamut.

These recipes are typically formulated using a large number of sampled data patches that are then interpolated to describe the transformation between the input and output spaces of the printing device. Because of the nature of the printer, these recipes are non-linear, time varying functions and thus are prone to inaccuracies if not updated at least occasionally. The updating process is tedious for customers and service representatives and is thus performed infrequently. If the process could be streamlined, it might be performed more frequently leading to improved color accuracy. With proper color calibration, customers could specify colors at document creation time and have an increased assurance that the printed colors would "match"(i.e. appear similarly to) the desired colors.

The input space (domain) describes all the possible ways of mixing the three printer colorants (for example, cyan, magenta, and yellow but many other triplets are possible.) Typically the halftone density of a colorant is specified by an eight bit integer (a whole number between 0 and 255). For the 3-space of inputs, the domain of the transformation consists of a three dimensional cube, two hundred fifty-five units on a side with one corner at the origin. The co-domain space of the transformation is the color gamut of the printer, the three dimensional volume that indicates all the L*, a*, b* values which are accessible by mixing the three colorants. This co-domain volume is of irregular shape and represents a sampled non-linear function of the input space. Since customers specify their desired colors in this space, the problem is to accurately print/display them and therefore derive the reverse transformation by inversion of the functional relationship between the domain and co-domain spaces detailed above.

No accurate functional representation of this transformation exists. The situation is complicated by the fact that the relationship between the digital inputs (domain) and the color outputs (co-domain) of the printer is not fixed for all time. If it were, the calibration could be performed once and always yield correct results. The variations in the appropriate calibration are due to variations in the printer's transfer function. Thus the transformation is at the same time non-linear (it requires a complex representation) and dynamic (varying in time).

On-line model prediction is also known as "system identification" in automatic controls literature. It is the terminology used for the process of characterizing a given control system. Characterization of the system can be done in two ways; non-parametric and parametric. In non-parametric system identification, the profile of the device can be measured by printing specific target colors as specified by the ICC standards. This profile is used as it is (without constructing any model of the device) while making rendering decisions/viewing of the customer colors on the monitor. This is one time measurement and does not use the historical information to construct any model. Whereas in the parametric system identification, target colors can be printed as chronological jobs in the banner sheet/header sheet or else the target colors can be extracted from the customer image and measured either by measuring straight from the output image or by rendering a subset of customer colors as target color patches. The intention in the parametric system identification is to adjust the parameters of the model and refine it over time by using past and present color data so that the model is accurate.

There is a continuing need for improved on-line modeling and convenient calibrating of color printing devices. Current needs are better served with model processing in a way that accurate parameters of a parametric model can be quickly identified through an interactive computation scheme. By "homeomorphism" in the context of this subject invention is meant the properties of the functions that are chosen to describe the transformations between sub-spaces in corresponding domains and co-domains where a particular parametric model defines the transformation from a domain value to a co-domain value. The homeomorphic transformations concerning a color marking device operation comprise the transformation function for data value conversion between the domain and co-domain. The subject invention deals with altering the defining boundary space of each of a set of subspaces, so that the parametric models associated with each subspace are varied to a set which cumulatively most accurately estimates the non-linear printer transforming process, and further can be updated or recalibrated much more easily than could be done in the past.

The subject invention exploits a key enabling factor for these operational advantages by constructing and maintaining a current model of the reproducing device operation (also known as the device profile or characteristic, input-output model of reproducible color). The new and improved method constructs a dynamic model by segregating color spaces into a set of homeomorphisms each having an associated parametric model. When a customer has a need to accurately match the colors displayed or printed on various output devices, such as monitors (CRT, LCD, etc.) and printers (xerographic, ink jet, ionographic, etc.) he/she can recalibrate the existing model with a minimal number of new data patches and avoid having to build an entire new model and corresponding CRD.

BRIEF SUMMARY OF THE INVENTION

In accordance with the present invention there is provided a method and apparatus for predicting a feedforward parametric model of the processing operation of a color marking device. A piecewise homeomorphism (PH) is configured to facilitate the construction of a parametric model associated with the PH that accurately approximates the transformation process of the marking device for an input signal to an output signal. The PH and parametric model are intended to be updated over time for recalibration of the printing system. An image is produced from the device in response to input signals and the image passes by a sensor which produces a value representative of the color of the printed image. An original aggregate parametric model determined from the original calibration is comprised of a plurality of PHs and associated parametric models. Outputs from the original model are computed in response to the input signal. When an error is determined between the image output signal and the model output that exceeds a predetermined value, an adjustment is made in the PHs. Each PH comprises a tetrahedron in three dimensions defined by a set of four vertices. New vertex locations from the input gamut are sampled with test patches for generation of a measured response to the input signals. The transformation data is used to recompute new associated parametric models for the reconfigured PHs. The updated set of parametric models is then used for input signal adjustment during regular run time operation of the system. The selective adjustment of the PHs and models can continue until the detected error is less than a predetermined value.

In accordance with another aspect of the present invention, the control system adjustment of the PHs and parametric models occurs regularly and continually during normal run time operation of the marking device.

In accordance with the present invention, there is provided a color printer comprising an image reproduction system for generating an output image in response to an input signal. A sensor is disposed for detecting a sensor signal representative of the color of the output image. An associated processor comprises a piecewise model of the image reproduction system for transforming the input signal into a model output. The processor includes a real-time parameter adjustment algorithm and a comparator. The comparator compares an output signal of the system with the model output wherein based upon output from the comparator the real-time parameter adjustment algorithm computes an updated set of parameters for the PH model and the PH model is updated in accordance with the updated parameters for transforming a subsequent input signal with the updated model until the comparator output is less than a predetermined error value. The PH model comprises a plurality of gamut partitions cumulatively representing the gamut of the printer. The adjustment algorithms comprise a means for reconfiguring the PH partitioning whereby the updated parameters more accurately model the image production systems.

One advantage of the present invention is an adaptive feedforward control system for accurately recalibrating a color marking device operation with minimal updating test samples.

Another advantage of the subject invention is that the printer model comprises a plurality of PHs and associated parametric models which are adjustable for automatic convergence of parametric model parameters to a better estimation of marking device operation.

Other benefits and advantages for the subject new method and systems will become apparent to those skilled in the art upon a reading and understanding of the specification.

BRIEF DESCRIPTION OF THE DRAWINGS

The invention may take physical form in certain parts and steps and arrangements of parts and steps, the preferred embodiments of which will be described in detail in the specification and illustrated in the accompanying drawings, which form a part hereof and wherein.

DESCRIPTION OF THE PREFERRED EMBODIMENTS

Figure 1:
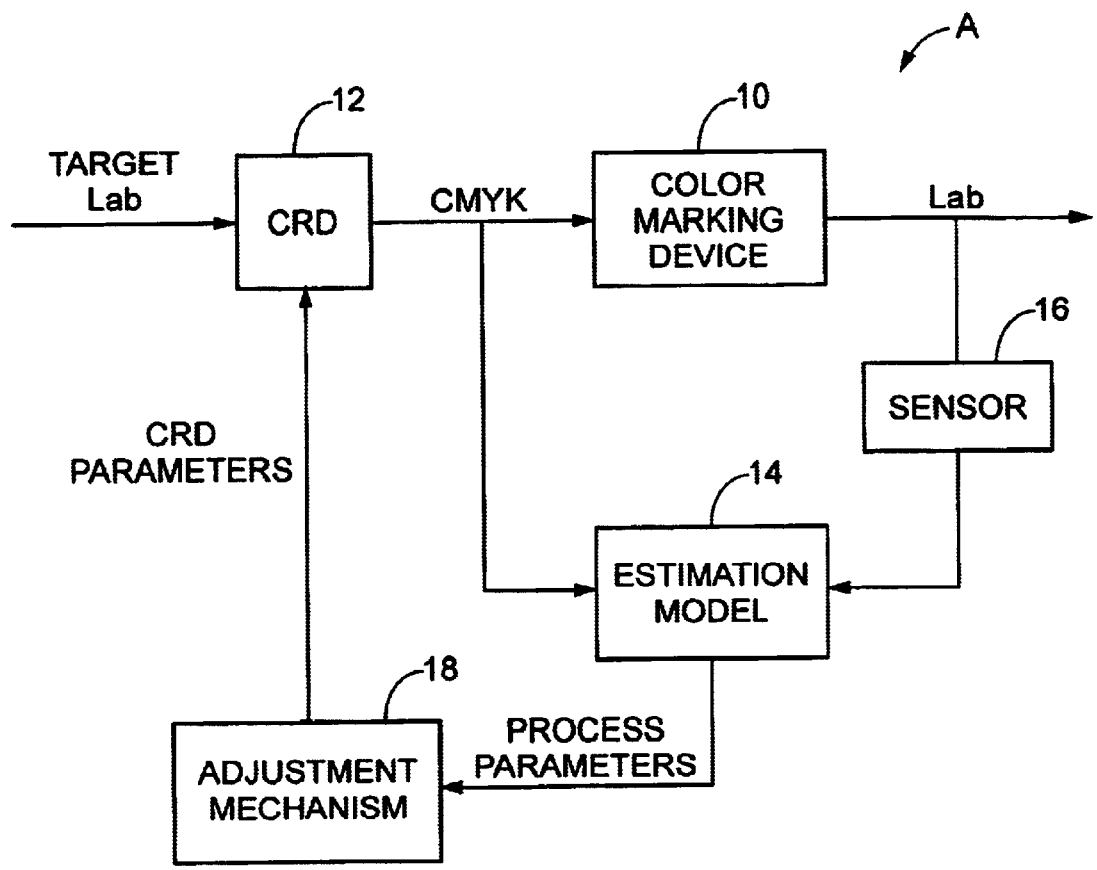
FIG. 1 is a schematic block diagram of an adaptive feedforward control system for a color marking device.

Referring now to the drawings wherein the showings are for purposes of illustrating the preferred embodiments of the invention only and not for the purposes of limiting same, the Figures show a method and apparatus for adaptive feedforward control of a color marking device with a PH model.

Figure 2:
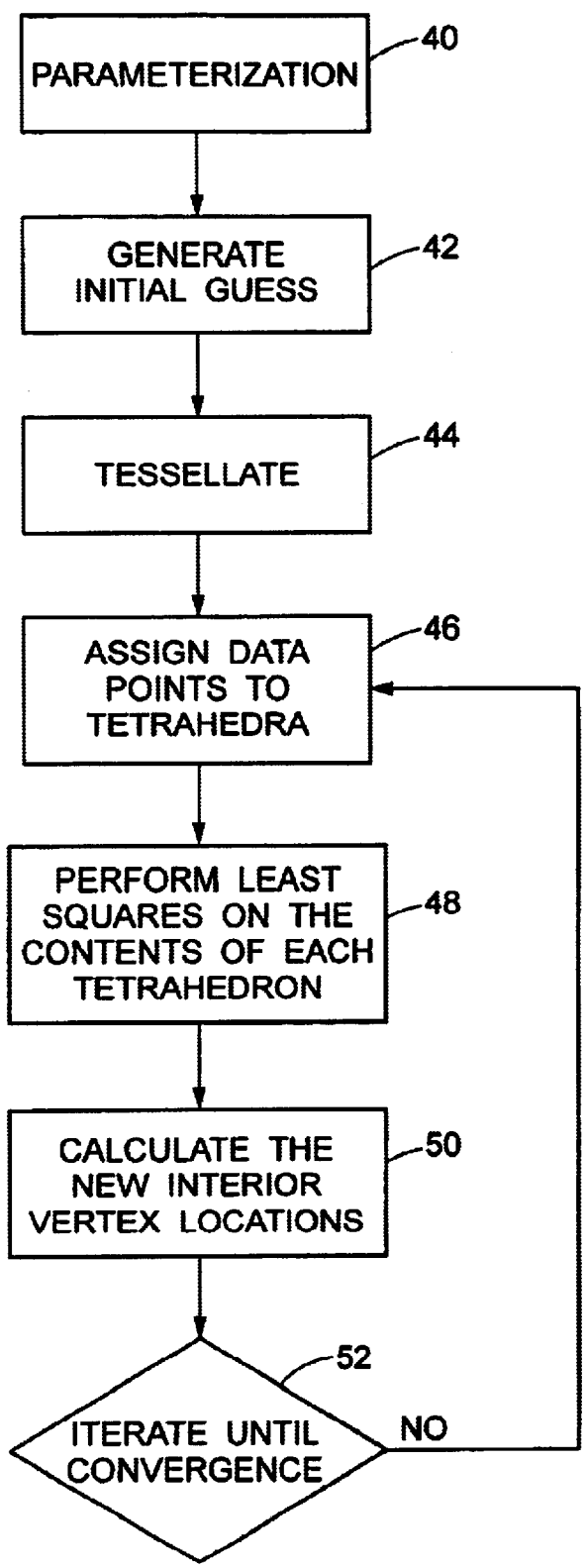
FIG. 2 is a flowchart detailing the processing steps for construction of a PH model representing the color marking device operation.
Figure 3:
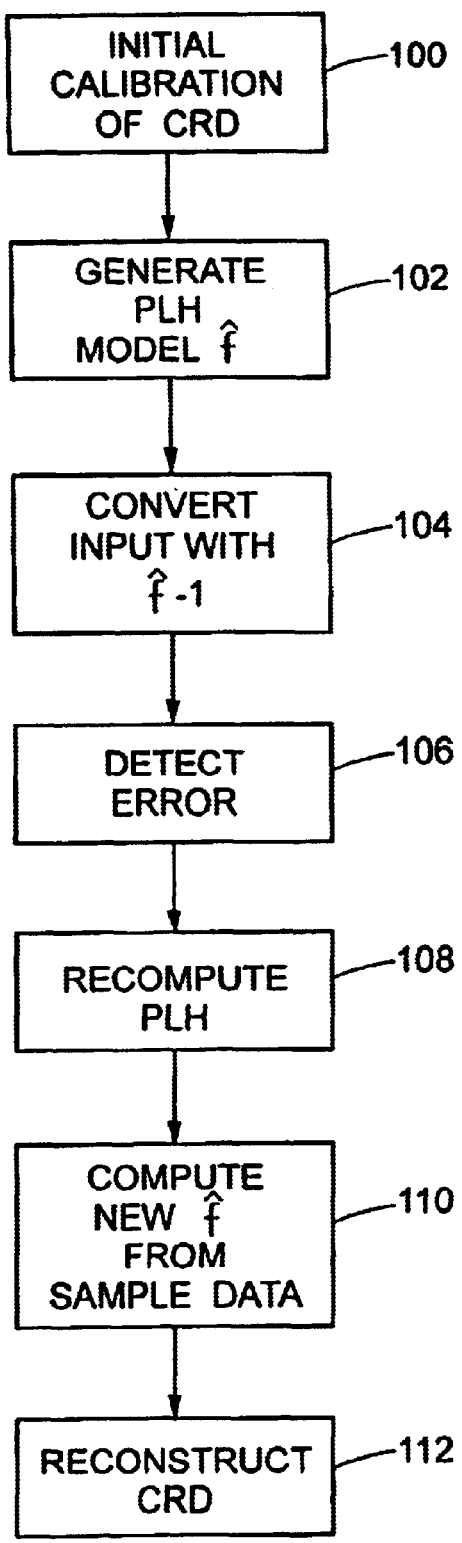
FIG. 3 is a flowchart detailing the control procedure for updating the PH model during on-line device operation.

With reference to FIGS. 1 and 3 a control system A is described which addresses the problems of variability in color mixing operations to better stabilize color reproduction for an individual marking device 10. The customer specified input target signal, L*, a*, b* is converted by a CRD 12 to a device dependent signal, CMYK, which produces a particular corresponding output signal that can be measured in device independent space L*, a*, b*. Of course, the particular spaces mentioned here are merely exemplary and other forms and representation of device signals can be used. The initial calibration 100 of the CRD 12 is obtained through a larger number (more than 1000 typically) of sample input signals which are printed as test patches and read for their corresponding output. All of the sample data can be utilized to construct an analytical or parametric model in the form f (CMYK)=L*, a*, b*. The true printer transfer function "f" is continuous and differentiable within the printer gamut. Outside the gamut the function is undefined. From the sampled data representation of f a PH approximation 14 is generated 102. The PH approximation f̂ is invertable and is constructed using the algorithm described in FIG. 2 below. For any input signal, the approximation has an associated error "e". The error is computed by converting 104 an input signal with an inverse of f̂ in the CRD 12 and then that signal is processed by the marking device. The actual output is compared in estimation model 14 for detecting 106 the error e between the device actual output signal and the output estimated by the model 14. The output signal can either be measured with a sensor manually in the conventional manner, or for improved on-line operation of the subject invention, the sensor 16 can be included in the system A to regularly monitor marking device 10 outputs. When the error e exceeds some predetermined value, the PH representation of the original function f is recomputed 108, i.e., reconfigured. A new functional representation f̂' is next computed using the adjusted PH representations and newly sampled data. A new more accurate CRD 12 can then be reconstructed 112.

Before discussing the details of the operation of the adjustment mechanism 18, it is necessary to understand the operating characteristics of the PH model. A particular advantage of the PH representation is that it may be readily inverted and sampled to yield the desired LUT and corresponding CRD 12.

Another advantage is that by partitioning the printer gamut into a plurality of PHs, each having an associated parametric model for the data values within corresponding PHs in the input and output gamuts, the cumulative model for the marking device is more accurate.

A parameterization 40 (FIG. 2) determines the degree or number of analytical, parametric models that are utilized for the functional approximation of the color processing transformation. Parameterization comprises choosing how many points the user wishes to use in the approximation of the function. Such a choice will determine the degree of accuracy possible. More points will yield improved accuracy. In the preferred embodiment for the three dimensional case the input domain (CMY) to the printer 10 is cubic by definition. The cube is, of course, defined by eight corner points. In parameterizing or segmenting the cube, tetrahedra are preferably employed, as opposed to another cube, because each tetrahedron can be defined with only four points as opposed to eight. The computational requirements for handling tetrahedra morphing during PH recomputing as opposed to other volumes are accordingly lessened by the lesser number of defining points. However, the subject invention is applicable beyond three dimensions to other arbitrary invertable functions represented as individual simplices. Corresponding tetrahedra must also be assigned to the co-domain space. For the cubic input domain of CMY space the eight points assigned to the co-domain cube will also be vertices of the tetrahedra partitions that fill the domain space. The domain space is completely filled or enclosed by the tetrahedral sub-spaces. The remainder of the chosen points will also be vertices that will be assigned to the interior or some end wall of the cube. The parameterization step essentially determines how many vertices are chosen to represent the input domain. It must also be kept in mind though, that the corresponding tetrahedra in the co-domain or output space (L*, a*, b*) which is, as noted above, not normally cubic, will enclose the co-domain. More importantly, the transforming of data values from the input domain to the output domain is nonlinear so that any linear, invertable approximation will not be completely accurate. However, it is a feature of the invention that each set of corresponding tetrahedra will have a parametric linear or non-linear model that will define a transformation process.

After the degree of parameterization is chosen, an initial definition of the coordinate positions of the interior vertices is generated 42. As will be later appreciated, the actual initial conditions will not be optimal and the convergence process is designed to effect the best available representation using the given parameterization. Accordingly, the generation step merely requires some definition of coordinates in the domain and co-domain for the tetrahedral vertices within the corners of the domain cube.

Tessellation 44 comprises defining the domain and co-domain volumes into a plurality of tetrahedra with a standard tessellation protocol program. Such a known program is a Delaunay tessellation, but of course other choices are possible. The objective of tessellation is to take the vertices defined by the parameterization step and connect them into tetrahedra so that the sub-spaces are defined. Ideally, the tessellation program not only deals with uniform tessellation of the domain and co-domain spaces but also may acknowledge a nonuniformed distribution of data within the domain and co-domain spaces. The tessellation in the domain is the same as the tessellation in the co-domain in that the domain tessellation is translated to co-domain tessellation. The tessellation must fill or enclose the domain space leaving no region uncounted.

Assigning 46 data points to the tetrahedra comprises assigning predetermined transformation data derived from a large number of sampled test patches to corresponding domain and co-domain tetrahedra. The transformation data is acquired by specifying many input values, printing the values as color patches and reading the corresponding output value coordinates of the output color in the co-domain space. Such acquisition of sample data is similar to prior art calibration methods used for building an LUT and a conventional CRD. The data values are then assigned to the tetrahedra by determining which tetrahedron encloses the data point in the domain and co-domain. Known computational geometric techniques are available for determination of which points are in which tetrahedral volumes.

The transformation process of a set of data values within a domain tetrahedron to a corresponding output data values in the co-domain space is approximated with a functional parametric model, for example in the linear case, mathematically represented by $$y=Ax+b \qquad (1)$$

where y represents the co-domain data value, x represents the domain value, A is the conversion matrix and b is the compensating offset value. Other forms of models could also be used, e.g., quadratic, cubic or analytic. Such a linear approximation will of course have some inaccurate representations (error "e") of the transforming process. However, the parametric model is determined in accordance with a conventional mathematical computation evaluation for minimizing the error by performing 48 a least squares analysis on the contents of each tetrahedron. Such least squares computation comprises a calculation of an N dimensional least squares (in the specific embodiment discussed here N=3) for each tetrahedron yielding the least squares parameters for the matrix A and the vector b. The error in the approximation is calculated by comparing the A and the vector b. The error in the approximation is calculated by comparing the Ax+b value to the actual transformation data value. After the parameters have been determined in accordance with the least squares analysis, the various corresponding tetrahedra, each having a respectively assigned parametric model, comprise cumulatively a piecewise homeomorphism (PH) representing the transforming process of input data values to output data values. In addition, the parametric model comprising part of the homeomorphism is a functional, invertable model which can be used to adjust a customer requested color as defined in device independent space (L*, a*, b*) to the appropriate device dependent CMYK input signal so that the printer can output the customer desired color (L*, a*, b*).

An objective function must be assigned to the performance of the cumulative set of functional models. For example, if the objective were that the functional models are exactly accurate with the predetermined transformation data, i.e., no error, then an objective function would measure the error between the models and the actual data. The least squares analysis above is such an objective function for error minimization. Other objectives could be chosen such as forcing continuity across the tetrahedra or minimizing the maximum approximation error. Of course other objectives are also possible. In any event, the error or discrepancy between the performance of the parametric model, and the actual test data value can be used as an important criterion for determining if the PHs should be altered for purposes of achieving a new and more accurate PH better satisfying the selected objective for the system. More particularly, for the subject embodiment, new vertex locations can be calculated 50 for the corresponding tetrahedra. Each vertex serves as a corner of some number of tetrahedra. Moving the vertex to a new location may better achieve the objective. One way to effect such moving is by calculating the average A matrix parameters and b vector parameters over the tetrahedra in which the vertex participates. These values are then used to determine a new value of the vertex position that will accordingly change the parametric model for that particular domain and co-domain tetrahedron set. This particular calculation scheme for adjusting vertex locations is particularly useful because using the average A and b values encourages continuity across the piecewise volumes, an important factor in color rendition. The other predetermined objects, noted above, could also be used individually or in combination for selectively moving the vertex points. The new vertex location effects a changing of the tetrahedron, and consequent redefinition of the parametric model based upon the change in data values within the tetrahedral volume. The new models which when compared against the objective function, will determine if yet another iteration 52 of the subject algorithm, and consequent adjusting of the tetrahedral sets, is appropriate until convergence is achieved wherein the cumulative set of parametric models best satisfy the objective in approximating the device transformation process. In other words, the algorithm will iterate 52 until some predetermined set of convergence criteria is met. Such criteria may include a minimum total step distance covered by all the interior grid points, a means squared error for the approximation or a maximum number of iterations. In addition, the motion of the vertices may have resulted in a mesh tangle. In this case, the iteration also requires retessellation to resolve the mesh tangle but, of course, alternatively, a retessellation may occur in each iteration anyway.

The result of this algorithm is a piecewise representation of the transformation that minimizes some objective function—the one used to determine vertex motion in step 50. With this function in hand an assessment of the precision of the approximation may be made by examination of the errors between the approximation and the data values taken during the initial data collection. If the approximation meets the application's requirements, the sequence terminates. If not, additional parameterization is performed and the sequence begun again but omitting the data collection exercise.

Returning to FIGS. 1 and 3, the recomputing PH step 108 comprises adjusting a set of vertices for the tetrahedra that are used together with the least squares calculation on the enclosed data points to generate a continuous representation of the true transfer function f. These vertices have CMY values and corresponding L*, a*, b* values at each time, t, during the operation of the marking device. New vertices are computed in the recomputing step for correspondingly reconfiguring the tetrahedra for enclosing a different set of actual data values, and hopefully, the new set will facilitate a better and more accurate, i.e., less error e, function f'.

Accordingly, the computing of the new f̂ function step 110 comprises sampling the data values at the vertex locations of the newly configured tetrahedra. Merely using the tetrahedral vertices as sample data values has been found to provide successful computation of a new function f̂, with minimal data values, and therefore is a much more efficient process for updating of the analytical model in terms of both time and processing power. The recalibration sampling is, thus, of a much lesser extent than the type of sampling needed to generate the initial calibration so that the system A can effectively use the estimation model 14 and adjusted mechanism 18 for continually upgrading the CRD 12 and thereby recalibrating the system A. The new co-domain vertex points, the original tessellation, and the original least squares approximations all comprise important considered aspects of the reconstruction of the CRD 12 in accordance with the subject PH form of modeling.

With a minimally parameterized approximate representation of the printer transfer function in hand, automatic, on-line recalibration of the printing system is possible. Sampling the color gamut at 1000 or more points prohibits the automatic adjustment because of the length of time involved to collect the samples automatically. The printer's time dependence would render the samples useless. Taking a large number of samples in this way does not define a single printer "state" but rather samples many states of the printer so no coherent picture of the printer can be obtained. However, a small number (say 50) of samples may be taken during a duration when the printer is nearly static in time.

The adaptive feedforward approach for on-line color control illustrated in FIG. 1 provides the advantage of, given an approximate inverse of the marking device function f, a straightforward processing system is provided for determining inputs that will give a desired color output. It is within the scope of the invention that the CRD can merely comprise the inverse of the function f, as opposed to a nonparametric LUT, although it is an alternative feature of the invention that the PH model could also be used to construct an LUT functioning as the CRD.

A particular advantage of the subject invention is that the adaptive feedfoward control systems succeeds particularly due to the fact that changes in marking device operation occur slowly relative to the data acquisition time for a small number of samples, so that the continual and gradual upgrading of the function f can be satisfactorily accomplished with essentially minor adjustments in PH configuration and parametric recomputation. Nonetheless, the effect of a continual recalibrating of the device presents a dramatic improvement in color consistency for the life of the marking device and ease of operation for the users of the device because of the removal of the requirements for manual calibration to maintain printer color predictability.

The invention has been described with reference to the preferred embodiments. Obviously, modifications and alterations will occur to others upon the reading and understanding of the specification. It is our intention to include all such modifications and alterations in so far as they come within the scope of the appended claims or the equivalents thereof.

Having thus described our invention, we now claim:

1. A method for predicting a model comprising a piecewise homeomorphism (PH) for a dynamically varying color marking device wherein color processing of the device is represented by a preselected form of the model including an initial set of parameters, the method including steps of:

producing an image with the device in response to an input signal;

sensing an output signal representative of the image;

computing from the model a model output in response to the input signal and comparable to the image output signal;

determining an error between the image output signal and the model output;

adjusting the PH when said determined error exceeds a predetermined value;

generating an updated set of parameters for the model from a prediction algorithm utilizing the adjusted PH and applying the updated set to the model; and, selectively executing said steps with subsequent input signals until said error is less than the predetermined value whereby the model including the adjusted PH and updated set of parameters comprises an accurate representation of device operation.

2. The method as defined in claim 1 wherein the determining comprises using a convergent least squares estimation algorithm as the prediction algorithm.

3. The method as defined in claim 1 wherein the PH comprises a partition of the gamut of the reproduction device and the adjusting comprises a reconfiguring of the partition to accommodate a more accurate parametric model.

4. The method as defined in claim 3 wherein the color processing is represented by a plurality of parameterized models each associated with a corresponding partition of the gamut, and wherein the selectively executing said steps comprises an on-line generating of the updated set of parameters for each of the plurality of models.

5. The method as defined in claim 1 wherein the PH comprises a piecewise set of invertable, functional approximations of the color space transformation of the printer wherein a data value is transformed from an input domain to an output co-domain; and wherein the adjusting includes:

parameterizing the approximations;

generating an initial set of parameters for the approximations;

tessellating the domain and co-domain in accordance with the parameters for partitioning the domain and co-domain into corresponding sets of domain pieces and co-domain pieces;

assigning predetermined transformation data to the corresponding sets of domain pieces and co-domain pieces and computing respective invertable, functional approximations for the transformation data for each of the corresponding sets;

evaluating an accuracy of the respective approximations against a preselected objective;

adjusting selected ones of the parameters; and, selectively iterating said steps in accordance with the adjusted selected ones of parameters until the evaluating satisfies a termination condition relative to the objective whereby the respective approximations cumulatively represent the transformation.

6. A color printer comprising:

an image reproduction system for generating an output image in response to an input signal;

a sensor for detecting a sensor signal representative of the output image; and, a processor comprising:

a piecewise homeomorphic (PH) model of the image reproduction system for estimating the input signal into a model output;

a real-time parameter adjustment algorithm; and a comparator for comparing an output signal of the system with the model output, wherein based upon an output from the comparator, the real-time parameter adjustment algorithm computes an updated set of parameters for the PH model and the PH model is updated in accordance with the updated parameters, for transforming a subsequent input signal with the updated model until the comparator output is less than a predetermined error value.

7. The printer as defined in claim 6 wherein the adjustment algorithm comprises a convergent least square estimation algorithm.

8. The printer as defined in claim 6 wherein the PH model comprises a plurality of gamut partitions cumulatively representing the gamut of the printer.

9. The printer as defined in claim 8 wherein the adjustment algorithms comprises means for reconfiguring the gamut partitioning whereby the updated parameters more accurately model the image reproduction systems.

10. A method of calibrating a color printer comprising updating a set of parameters for a piecewise homeomorphic (PH) model representing color space transformations by the printer of an input signal to an output signal, wherein the printer includes a sensor for detecting a signal representative of printer color output, the method comprising steps of:

producing an image with the printer in response to the input signal;

sensing with the sensor the signal representative of the printer color output;

generating an output from the PH model responsive to the input signal and comparable to the sensed color signal;

determining a difference between the sensed signal and the parametric model output;

adjusting the PH model if the difference exceeds a predetermined value;

generating an inverse of the updated PH model; and, transforming a subsequent input signal with the inverse of the updated PH model whereby subsequent images produced by the printer are made in accordance with the inverse of the updated PH model.

11. The method as defined in claim 10, wherein the PH model comprises a set of vertices within a color space defining a set of tetrahedra filling an input domain of the printer, a corresponding set of tetrahedra in an output co-domain and a set of parametric models defining transformations from the input domain to the output co-domain for the corresponding tetrahedra, and wherein the adjusting comprises calculating the vertices relocating to new positions wherein the parametric models more accurately represent the color space transformations by the printer.

12. The method as defined in claim 11 wherein the adjusting comprises processing the parametric models through an estimation/prediction algorithm for computing an updated set of parameters.

13. The method as defined in claim 11 wherein the producing comprises applying a selected test target signal as the input signal.

* * * * *